United States Patent [19]
Colinet

[11] 3,830,998
[45] Aug. 20, 1974

[54] SINGLE ARC ELECTRIC WELDING WITH MULTIPLE PATHWAYS

[76] Inventor: Rene D. Colinet, 1525 Earl St., Philadelphia, Pa. 19125

[22] Filed: June 5, 1973

[21] Appl. No.: 367,232

[52] U.S. Cl. .............................. 219/137, 219/127
[51] Int. Cl. .......................................... B23k 29/00
[58] Field of Search ............................ 219/127, 137

[56] References Cited
UNITED STATES PATENTS

| | | | |
|---|---|---|---|
| 2,814,719 | 11/1957 | Wilson | 219/127 |
| 2,957,977 | 10/1960 | Sullivan | 219/127 |
| 3,013,144 | 12/1961 | Adamson et al. | 219/127 X |
| 3,612,816 | 10/1971 | Hand | 219/137 X |

*Primary Examiner*—R. N. Envall, Jr.

[57] ABSTRACT

A process of automatic arc welding using a single electric arc of high intensity to weld with a fusible electrode metallic parts along multiple and distinct pathways by successive deposition of individual high-penetration welds distributed over separate pathways.

9 Claims, 9 Drawing Figures

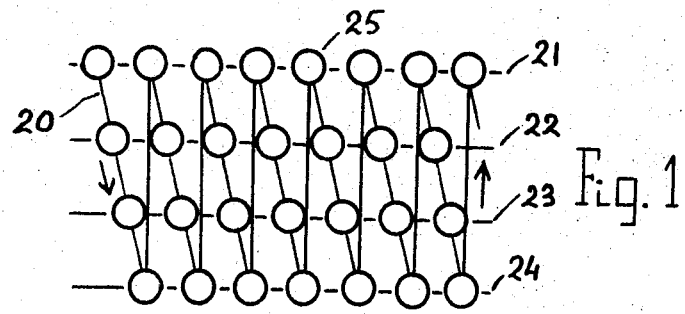
Fig. 1
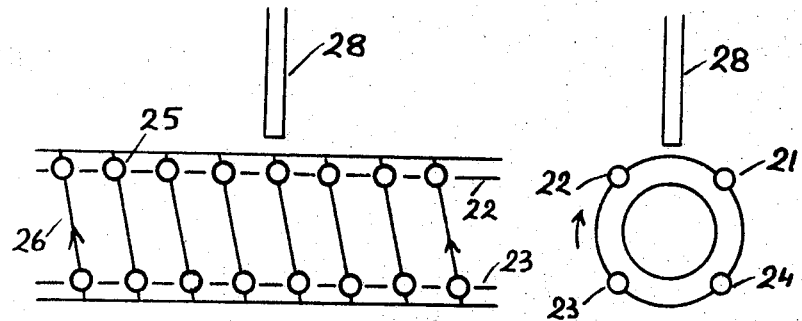
Fig. 2
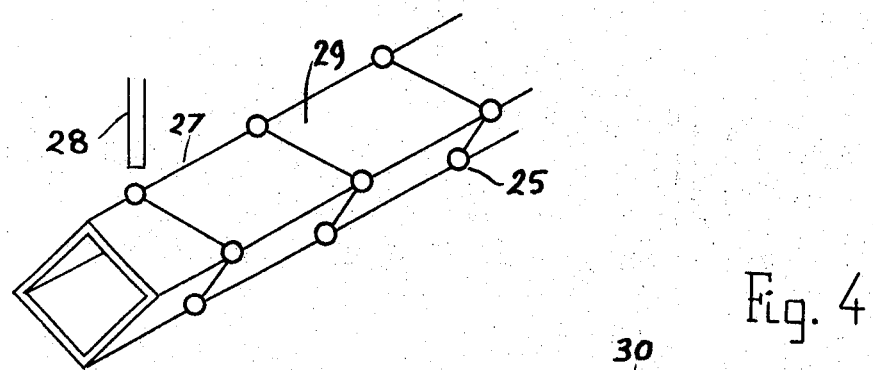
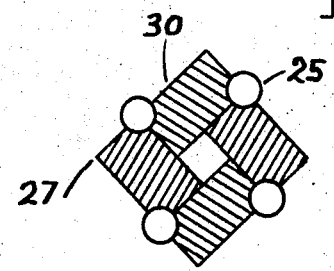
Fig. 3
Fig. 4

SINGLE ARC ELECTRIC WELDING WITH MULTIPLE PATHWAYS

SUMMARY OF THE INVENTION

In conventional arc welding, there is generally a single electrode from which an arc is struck to the work, with metal being transferred from the electrode to the weld bead or fillet. This is true for manual open arc with coated electrodes, for semi-automatic and automatic continuous welding with bare or internally-fluxed wires of great length, or for submerged arc welding.

In all such known cases, each electrode deposits only one single bead of weld material.

The present invention refers on the contrary to a different use of the single arc, in which several distinct pathways of welded joints may be obtained simultaneously without any arc interruption. The technical advantages and cost reduction of such a possibility are explained herebelow.

Contrary to impulsion-type welding processes, the single arc of this invention delivers an uninterrupted high intensity current with constant voltage, first on a location of the work to be welded, where a short weld is produced, then the same arc jumps rapidly to another location to produce a second short weld, without having deposited any metal on the work between the first and the second locations because of insufficient time to heat the part between the two welded locations. Yet, the arc has retained all through this time its current and voltage.

The welds so obtained are not necessarily distributed along a single pathway in the present invention. Instead, they can involve several distinct pathways. For example, there may be three separate straight and parallel pathways, and if the successive welds are numbered in the order of their sequence, welds 1, 4, 7 and 10 could be deposited on the first alignment, while welds 2, 5, 8 and 11 could cover the second alignment and welds 3, 6, 9 and 12 could be located on the third alignment. Welding therefore progresses simultaneously on all the alignments.

A first advantage of the process of this invention is to use with advantage the property of a welding arc to deposit sometimes no weld metal on the work even though the arc still reaches the part with full current and voltage, simply by having the arc move fast enough over the work. But when this motion is stopped or slowed down, and with no changes in the electric parameters, the same arc will initiate a weld provided the impact point on the part becomes hot enough to melt superficially.

By alternately moving the arc at great speed over the part and at no or little speed, a succession of separate short welds will be obtained with no need for current-interrupting devices or voltage changers.

Another purpose of the invention is to apply this dual behavior of a single arc to weld separate assemblies at the same time on distinct pathways.

Another purpose of the invention is to weld together and simultaneously several elongated matallic bars set side by side to form a closed tubular shape, as a pipe, or a box beam, without the complication of uneven heat shrinkage and side bending. Since the heat is distributed equally around the edges and all at the same time the welded assembly retains perfect straightness after completion.

Other possibilities and advantages of this new technique are illustrated and described herebelow:

FIG. 1 shows in plan view several parallel alignments on a single plate, all being spot-welded simultaneously from left to right.

FIG. 2 shows an application of the arrangement of FIG. 1 where the plate is replaced by a cylindrical body such as a tube.

FIG. 3 is another modification of the tube which is square instead of round, using the welds at the corners to joint several longitudinal seams between parallel flat bars.

FIG. 4 is the application of the arrangement of FIG. 3 where the four flats are thick and narrow, thereby providing an inexpensive method to produce tubes having extra-heavy wall thickness with extra-small central passage.

Figures 5, 6, 7:
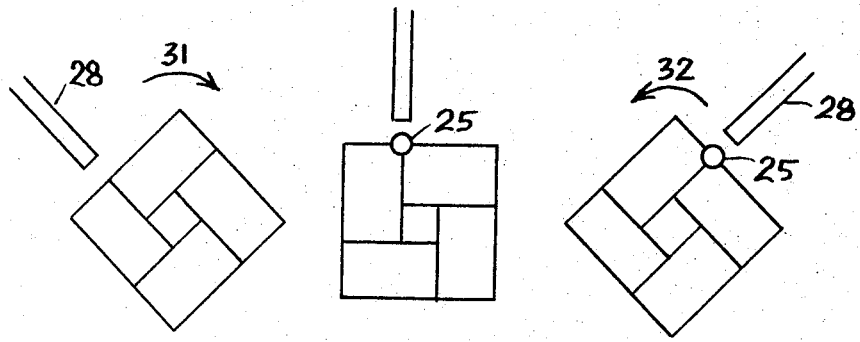
FIGS. 5, 6 and 7 show three successive positions of the tube of FIG. 4, detailing the technique used for fast welding.

Examining now these Figures in their order of numeration, FIG. 1 illustrates the zigzag or oscillatory trajectory 20 of a single arc over a plate, when said arc jumps quickly from one weld to the next with relatively long stops between the jumps. The arrangement shows four parallel and distinct straight pathways 21, 22, 23 and 24 with welding covering them in rapid intertwined succession while all the pathways get welded simultaneously at the same speed from left to right. Each weld such as 25 is obtained by stopping the arc over the plate at that location.

In FIG. 2, the work is cylindrical as a tube or pipe and four parallel pathways are distributed at 90° of each other. The successive spotwelds 25 can be obtained by various combinations of the relative motion of the arc with respect to the pipe, such as:

a. The arc is stationary and the pipe revolves rapidly and helically 90° around its axis, then stops for weld time, then revolves again 90° and so on. By using a short pitch for the helix 26, the individual welds on each path can be made to overlap each other, forming a continuous and tight weld on each pathway.

b. For heavy and long pipes having considerable inertia, their helical motion can be made continuous, with the electrode 28 oscillating along the same spiral path back and forth, at the same angular speed as the pipe (zero relative motion) with the same direction for arc and pipe. After the welding stroke, the direction of rotation of the arc is reversed to jump from the completed weld of pathway 21 to the next pathway 22 with no welding inbetween.

c. The tube can rotate steadily as in (b) but without the helical displacement. Instead, the arc is given a slow synchronized speed in its motion along the pipe.

In FIG. 3, the relative motions are the same as in FIG. 2 but the tube is square instead of round, with the welds centered on the corners 27 between the flat faces of the tube, thereby showing a method to weld a square pipe from 4 elongated flats 29 positioned properly in the vicinity of the electrode 28 before the latter welds the seams together, either as spot welds as in 25, or continuously as mentioned hereabove.

In this case, the motions can be simplified because the arc length varies considerably as the square tube rotates in front of it. A sufficient rotating speed is required for the tube to overcome the tendency for the arc to retain its normal length by the purely electrical means of conventional arc welding.

The corners 27 receive maximum heat concentration at the time they approach the electrode tip 28, producing therefore the desired welding on the corner seams. On the contrary, the flat faces 29 of the tube are further away from the arc which is now too long to deposit any metal. The simplified motion could be a constant helical rotation for the pipe in front of a stationary arc, or a steady pure rotation of the tube combined with a constant speed translation of the arc along the pipe. Both methods could provide very fast welding if high current density is available.

It should be noted also, as a special advantage of the method for square tubes, that a 90° corner 27 of the pipe absorbs heat from the arc around a 270° angle while the internal heat losses through the joint are limited to 90°. This heavy inbalance in the heat flow through the wall of the tube at the corners greatly favors melting the corner quickly. On the contrary, flat faces 29 show only 180° of heat penetration and 180° on heat exit, and much less fusion by the arc. The two effects of a shorter arc and of a greater angular exposure of the corner arc therefore additive and assist fast production of such welded tubes.

FIG. 4 is a variation of FIG. 3 where the four flats 30 are narrow and thick, with the welds shifted from the corners to the seams between the flats. By using the technique described in FIG. 2 for a cylindrical tube, the welds can be positioned properly on the seams. The interest here is to produce heavy-walled tubes from inexpensive flats with a central hole as small as desired. Such tubes can be used as fusible wire-guides in the Electroslag welding process, in replacement of the costly seamless tubings now generally used. No tightness is needed for the seams and spot welds as far apart as 12 inches are sufficient, which provides for great production speeds. Another variation would consist in replacing the flats by triangular bars with one face cylindrically curved to produce the same-cross section as in FIG. 4, except for a round periphery instead of a square one.

Figure 8:
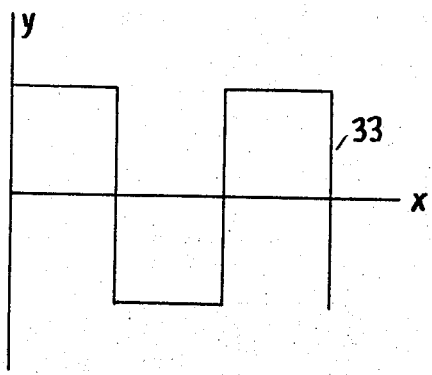
FIG. 8 shows a square-wave speed curve used preferably in this invention.
Figure 9:
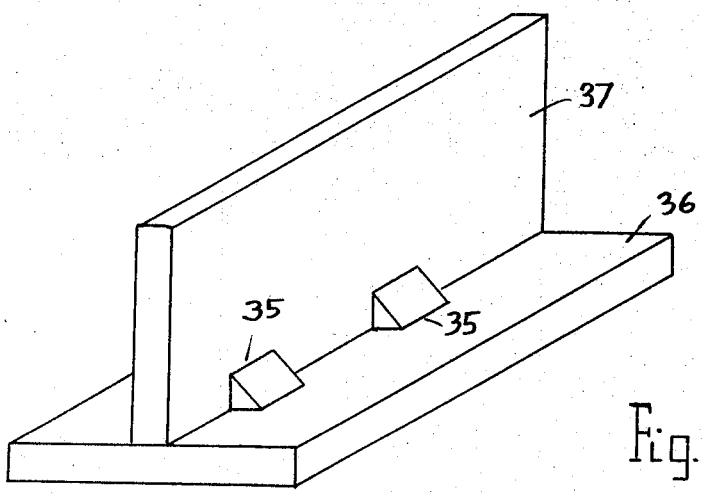
FIG. 9 shows the application of the invention to a single longitudinal weld when interrupted beads are desired without the usual intervention of changes in the electric parameters of the arc.

FIGS. 5, 6 and 7 illustrate the motion requirements for the making of tubes as in FIG. 4. In FIG. 5, the arc has just arrived in front of a seam and begins a period of fixed position over it. Both the arc and the tube rotate at the same angular speed (arrow 31) from the FIG. 5 position to the FIG. 7 position. By now the seam is welded and the arc alone returns to position 6 and further to position 5 to begin a new weld (arrow 32). The clockwise rotation of the pipe has continued throughout the full arc cycle (arrow 31). When the electrode is given an oscillatory motion of this kind, the preferred form of speed change is the square-wave curve shown in FIG. 8 by the curve 33 in axes x for time and y for speed. This speed is constant except for quick reversals in direction. With the same speed given to the pipe, the arc is fixed relative to the pipe in one direction, and at double relative speed to return the arc in reverse direction.

Similar oscillatory motions can also be given along a conventional single pathway for interrupted fillet welds 35 between a horizontal plate 36 and a vertical stiffener plate 37 in a T joint, such as in fully-webbed large I beams for bridges or in hulls of welded ships. Such interrupted welds have the advantage over continuous welds, of reducing either the shrinkage distortion of straight alignments, or the residual stresses in the structure if distortion is prevented by rigidized joints. The same purpose is now achieved by interrupted welding beads or fillets which require electric means to break and restart heavy currents or changing the voltage periodically. The comparative short welds as per the invention (about 1 inch long for example) are more effective against internal residual stresses and their sequencing can be much faster since no switches are needed at the power source.

Another advantage of such short welds of the invention with time cycles of a few seconds only is to permit the use of high welding currents even for thin plates or sheets which could not stand such currents for a while without piercing through. The parameters could for instance be adjusted to melt three-fourths of the depth through a plate with precise time-setting, such as with spot resistance welding of thin sheets, but with purer weld material since the slag removes all oxides and impurities.

Many other forms of execution of the process of the invention are possible under the principles described for the welding technique.

Having thus outlined my invention, what I claim as new and desire to secure by Letter Patent is:

1. In an automatic open arc welding process, the steps of feeding downward a continuous wire electrode by means of a standard wire-feeder at substantially constant speed, connecting the electrode to one terminal of a standard electric welding power source while the other terminal is connected to horizontal work pieces being welded, supplying substantially constant electric current and voltage to the electrode to initiate and to maintain a welding arc between the electrode and the work, traversing the electrode horizontally relative to the work by motorized means, the improvement comprising two classes of short electrode horizontal motions, first a series of traversing motions at a speed in excess of what is needed to deposit metal from the electrode upon the work by melting it as an adherent weld bead, such excess speed producing no weld by lack of sufficient heating of the work by the arc, and second another series of motions alternating with the first at a weld seam but having slow welding speed and forming normal adherent welds on the work, all said motions being simultaneous with the constant and uninterrupted current and voltage of the electric arc.

2. An open arc automatic welding process as per claim 1 where the electrode is given the motions having high speed while the work is given the motions having low speed.

3. An open arc welding process as per claim 1 where the distance between the tip of the electrode and the work is made to vary faster than the correcting response of arc length stabilization, in successive short impulses during which the arc becomes temporarily shorter, thereby increasing the heating locally on the work to reinforce the welding action on said locations.

4. An open arc automatic welding process as per claim 1 where the work pieces are elongated and narrow bars in mutual lateral contact in closed tubular formation while the arc proceeds along a helical trajectory respective to and around the tube to weld one tack at each crossing between said trajectory and the contact lines.

5. An open arc automatic welding process as per claim 1 where a first displacement of the electrode is oscillatory in square-wave speed cycling with periodical steps of equal time duration sequentially numbered, with constant speed steps in one direction during each duration for the class of even numbers and with the same constant speed steps in the opposite direction of equal durations for the class of odd numbers, said steps of one class having a speed substantially equal to the continuous speed of motion of the work on the same trajectory and relative to the middle-point of the electrode oscillation, resulting in doubling the speed of the relative motion of electrode to work, while said steps of the other class have relative immobility of the electrode with respect to the work, resulting in a succession of tack welds on the work along said trajectory.

6. An open arc automatic welding process as per claim 1 where a first displacement of the electrode is oscillatory in square-wave speed cycling with periodical steps of equal duration sequentially numbered, with constant speed steps in one direction during each duration for the class of even numbers and with the same constant speed steps in the opposite direction of equal durations for the class of odd numbers, said steps of one class having their speed lower than the continuous speed of the work, relative to the middle point of the electrode oscillation stroke, resulting in a succession of welds and gaps both of selective length along said trajectory, depending on the speed difference for the work with respect to the electrode.

7. An open arc automatic welding process as per claim 1, where the periods of non-welding correspond to an arc longer than normal and not depositing metal on the work, while the welding periods correspond to an arc of normal length.

8. An open arc automatic welding process as per claim 1, where the arc moves over the work in fast jumps separated by stops of relatively long duration, said jumps covering in succession a plurality of distinct separated welding pathways.

9. An open arc automatic welding process as per claim 1, as applied to the manufacture of various symmetrical profiles having multiple equally spaced parallel seam being welded sequentially in fast repeated cycles from each seam to the next, thereby distributing contractions simultaneously and equally for all the seams.

* * * * *